May 21, 1940.  H. J. MINICONI  2,201,373
AUTOMATIC JACK DEVICE FOR AUTOMOBILES
Filed Dec. 23, 1938

INVENTOR
H. J. Miniconi.
By Lacey & Lacey, Attys

Patented May 21, 1940

2,201,373

UNITED STATES PATENT OFFICE 2,201,373

AUTOMATIC JACK DEVICE FOR AUTOMOBILES

Henri Jules Miniconi, Stains, France

Application December 23, 1938, Serial No. 247,530
In France September 28, 1938

1 Claim. (Cl. 254—86)

The device which is the object of the present invention enables the axle to be lifted by slightly backing the vehicle, so that a repair can be carried out on one of the tires, the device having come into contact with the ground owing to the deflation of the tire.

The device is formed in principle by a metal segment which is suspended below the axle by means of an eccentric bracket. An automatic locking system enables the segment to be returned, after operation, to its inoperative position and locked therein.

In the accompanying drawing, an embodiment of the invention has been shown by way of example only.

Figure 1:
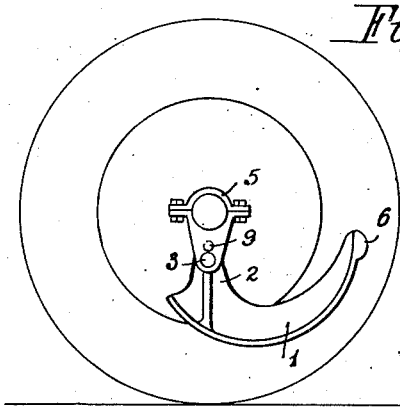
Fig. 1 shows an elevation of the device suspended below the axle.
Figure 4:
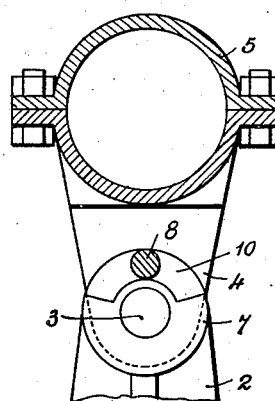
Figs. 4 to 6 are detail views of the locking device.
Figure 5:
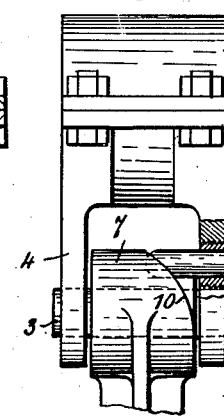
Figure 6:
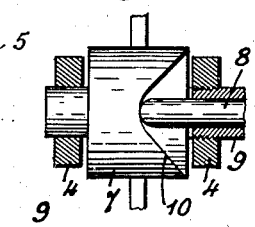
Figure 2:
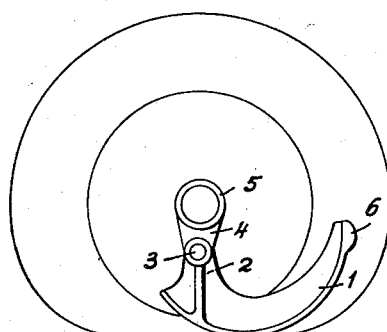
Fig. 2 is a similar view to Fig. 1, the tire being deflated.
Figure 3:
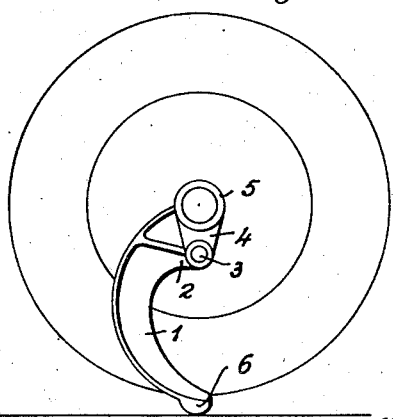
Fig. 3 shows the axle lifted from the ground.

As stated above, the device which automatically lifts automotive vehicles when one of the tires is punctured, comprises a metal segment 1, suspended by an eccentric bracket 2 from a pin 3 which is secured to a jaw 4 fixed on the axle by means of a collar 5.

Each axle is provided with two apparatus which are located near the wheels so as to enable them to operate automatically when a tire is punctured.

The periphery of the segment 1 is provided with serrations which ensure a firm adherence to the ground, and with a bulge 6 which reinforces its end.

In order to prevent the apparatus from swinging while the vehicle is running and to return it to its inoperative position, the hub 7 of the bracket 2 is subjected to the action of a locking system which locks it but which is adapted to operate automatically when the segment comes into contact with the ground.

The locking system comprises a spring-pressed bolt 8 lodged in a socket 9 which is secured to the jaw 4. The end of the bolt is in contact with a cam 10 provided in the hub 7 of the bracket 2.

When one of the tires becomes deflated, the vehicle being provided with apparatus according to the invention, the collapse of the tire brings the periphery of the segment 1 into contact with the ground. The scraping of the end of the apparatus against the ground warns the driver that one of his tires is deflated. He stops his vehicle and by backing, compels the apparatus which is in contact with the ground to roll on same and, owing to the eccentricity of the bracket 2, lift the wheel of which the tire requires repairing.

By getting out of the vehicle, the driver can immediately, and without any other lifting operation, replace the defective wheel.

The spring-pressed bolt 8 is pushed back into its socket 9 by the cam 10, and when the repair has been effected and the vehicle runs forwards, the segment 1 is thrown backwards by the movement and the spring-pressed bolt comes into contact with the beginning of the slope of the cam 10 and compels the hub 7 to rotate until the instant when the segment is in its inoperative position.

It is obvious that the example described and illustrated is only given by way of example and that the apparatus may vary in its constructional shapes as well as its locking device, without for that reason exceeding the scope of the invention.

I claim:

In combination with a vehicle axle, a wheel on the axle, and a tire on the wheel, an automatic jack device for automobiles including a segment, an eccentric bracket connected with the segment, a jaw, means rigidly mounting the jaw on the axle, means pivotally connecting the bracket with the jaw, said bracket having a hub formed with a cam face, a socket on the jaw, and a spring pressed bolt in the socket, said spring normally urging said bolt to engage the cam, said segment being engageable, upon deflation of the tire, with a surface for warning the driver of deflation of the tire, reversing of the vehicle effecting raising of said axle by said segment for clearing said tire from the surface, said bolt engaging said cam for retaining the segment in raised position.

HENRI JULES MINICONI.